United States Patent
Lee et al.

(10) Patent No.: US 6,631,031 B2
(45) Date of Patent: Oct. 7, 2003

(54) POLARIZATION SPLITTING BACKLIGHT MODULE

(75) Inventors: Chih-Kung Lee, 6F, No. 3, Lane 165, Tun Hwa North Road, Taipei (TW); Chyan-Chyi Wu, Tai-zhong (TW); Ching-Heng Tang, Taipei (TW)

(73) Assignee: Chih-Kung Lee, Taipei (TW)

( * ) Notice: Subject to any disclaimer, the term of this patent is extended or adjusted under 35 U.S.C. 154(b) by 0 days.

(21) Appl. No.: 09/728,714

(22) Filed: Nov. 30, 2000

(65) Prior Publication Data

US 2001/0033417 A1 Oct. 25, 2001

(51) Int. Cl.[7] ................................................. G02B 5/30
(52) U.S. Cl. ........................ 359/487; 359/495; 359/497; 362/19; 362/31
(58) Field of Search ......................... 359/485, 487, 359/494, 495, 497; 362/31, 558, 560, 19; 349/61, 62, 64, 65, 67

(56) References Cited

U.S. PATENT DOCUMENTS

| | | | | |
|---|---|---|---|---|
| 5,587,816 A | * | 12/1996 | Gunjima et al. | |
| 5,712,694 A | * | 1/1998 | Taira et al. | |
| 5,729,311 A | * | 3/1998 | Broer et al. | |
| 5,808,709 A | * | 9/1998 | Davis et al. | |
| 5,816,677 A | * | 10/1998 | Kurematsu et al. | |
| 5,856,855 A | * | 1/1999 | Mol et al. | |
| 5,914,760 A | * | 6/1999 | Daiku | |
| 5,917,565 A | * | 6/1999 | Suzuki | |
| 6,020,944 A | * | 2/2000 | Hoshi | |
| 6,104,454 A | * | 8/2000 | Hiyama et al. | |
| 6,239,851 B1 | * | 5/2001 | Hatazawa et al. | |
| 6,373,630 B1 | * | 4/2002 | Lee et al. | |
| 6,447,135 B1 | * | 9/2002 | Wortman et al. | |

* cited by examiner

Primary Examiner—Ricky D. Shafer
(74) Attorney, Agent, or Firm—J. C. Patents

(57) ABSTRACT

A polarization splitting backlight module for efficiently emitting polarized light beams is disclosed. The polarization splitting backlight module of the present invention comprises a light source, an under plate, a substrate, a phase retardation reflective film, a scattering structure, a thin film and an upper cover. The light beams emitted from the non-polarized light source are introduced into the substrate, and after scattering, reflection, phase retardation and polarization splitting, the light beams will pass through the upper cover being of a single polarization state so as to be utilized by electro-optical systems, such as liquid crystal displays. The present invention converts light beams into a single polarization state, and thereby the efficiency of polarization splitting, as well as the brightness, are higher than that of a conventional backlight module.

7 Claims, 8 Drawing Sheets

A typical phase retardation film
(Angle of incidence with respective to substrate : 45degrees)

A typical phase retardation film
(Angle of incidence with respective to substrate : 45degrees)

POLARIZATION SPLITTING BACKLIGHT MODULE

BACKGROUND OF THE INVENTION

1. Field of the Invention

The present invention relates generally to backlight modules, and more particularly to a polarization splitting backlight module for converting non-polarized light beams into light beams of a single polarization state.

2. Description of the Related Art

With the advent of the information technology (IT) age, there is an increasing demand for high-quality electro-optical displays, such as LCDs. Higher quality imaging requires the more efficient utilization of light sources. Conventionally, for obtaining single-polarized light beam output from a LCD backlight module, a polarization plate is arranged near the light source to inhibit the passage of certain polarized light beams, whereby the polarized light beams which are not parallel are prevented from being transmitted. In practice, the resultant light beams of a single polarization state are less than half of those of the original light source in terms of illuminance.

With reference to FIG. 1, a conventional liquid crystal display comprises a non-polarized light source 30, a diffuser 20, a polarization plate 14 and a liquid crystal component 50. Light beams emitted from the non-polarized light source 30 are introduced into the diffuser 20, and are screened by the polarization plate 14 so as to output light beams of a specific polarization state to be utilized by the liquid crystal component 50. The intensity of the resultant light beams will be reduced over 50% and will be less than half of the intensity of the original light beam due to the screening effect of the polarization plate 14. Since the optical energy loss between the resultant and original light beams is considerable, the power consumption of a system using such a module is very significant, thereby limiting the quality of the image display.

SUMMARY OF THE INVENTION

In view of the above problems, the principal object of the present invention is to provide a polarization splitting backlight module for converting light beams into a single polarization state, which reduces the optical loss in light beam output, is suitable for mass production, and decreases manufacturing costs.

Another object of the present invention is to provide a polarization splitting backlight module, which is easily integrated with conventional light guides and achieves high-quality polarization splitting.

To achieve the first object, the present invention provides a polarization splitting backlight module for converting light beams into a single polarization state, comprising an under plate having an upper surface and a ridged lower surface; a phase retardation film of high reflectivity, disposed on the ridged lower surface of the under plate; a substrate having a lower surface, substantially complementary to the upper surface of the under plate and facing therewith, and a ridged upper surface; a light source located at the lateral side of the substrate and the under plate for emitting a plurality of light beams; a scattering structure disposed between the substrate and the upper surface of the under plate for altering the polarization state and the travelling direction of the light beams; an upper cover having a ridged lower surface, substantially complementary to the ridged upper surface of the substrate and facing therewith, and an upper surface; and a thin film disposed between the upper cover and the substrate, having an index of refraction different from that of the substrate.

The present invention further provides a polarization splitting backlight module, comprises a substrate having a ridged upper surface and a ridged lower surface, a scattering structure disposed on the ridged lower surface of the substrate, a phase retardation film of high reflectivity disposed under the scattering structure, an upper cover having a ridged lower surface and an upper surface, and a light source located at the lateral side of the substrate. Furthermore, the ridged lower surface of the substrate in the above construction may be modified as a flat surface without affecting the polarization splitting effect of the backlight module.

In order to enhance the optical performance, the ridge pitch of each ridged surface may be constant or not so as to increase the design freedom. Moreover, in order to increase the efficiency for altering the polarization states, the phase retardation reflective film is utilized. In addition, four lateral side-surfaces of the polarization splitting backlight module may be optionally provided with reflective films, so as to confine the light beams within the backlight module and thereby increasing the transmission efficiency of the light beams through the upper surface of the upper cover.

To achieve the second object, the present invention provides a polarization splitting backlight module for converting light beams into a single polarization state, comprising an under plate having an upper surface and a ridged lower surface; a phase retardation film of high reflectivity, disposed on the ridged lower surface of the under plate; a substrate having a lower surface, substantially complementary to the upper surface of the under plate and facing therewith, and an upper surface; an upper cover film having a lower surface, substantially complementary to the upper surface of the substrate and facing therewith, and a ridged upper surface; a light source located at the lateral side of the substrate and the under plate for emitting a plurality of light beams; a scattering structure disposed between the substrate and the upper surface of the under plate for altering the polarization state and the travelling direction of the light beams; an upper cover having a ridged lower surface, substantially complementary to the ridged upper surface of the upper cover film and facing therewith, and an upper surface; and a thin film disposed between the upper cover and the upper cover film.

With this construction, the polarization splitting backlight module can be easily integrated with a conventional liquid crystal display backlight module by attaching the lower surface of the upper cover film and the upper surface of the substrate to the upper side and lower side of the diffuser of the conventional backlight module respectively.

Additional advantages, objects and features of the present invention will become more apparent from the description which follows.

BRIEF DESCRIPTION OF THE DRAWINGS

The present invention is disclosed in the detailed description given hereinbelow and the accompanying drawings, which are presented as means of illustration only and thus are not limitative of the present invention, in which.

DETAILED DESCRIPTION OF THE PREFERRED EMBODIMENT

Figure 1:
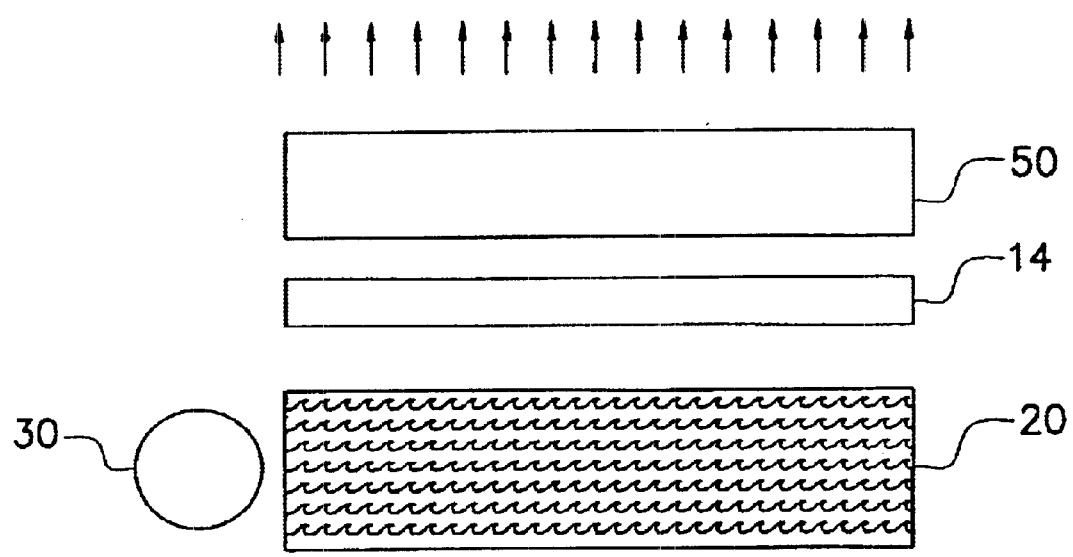
FIG. 1 is a schematic drawing showing a conventional backlight module used in a liquid crystal display.
Figure 2:
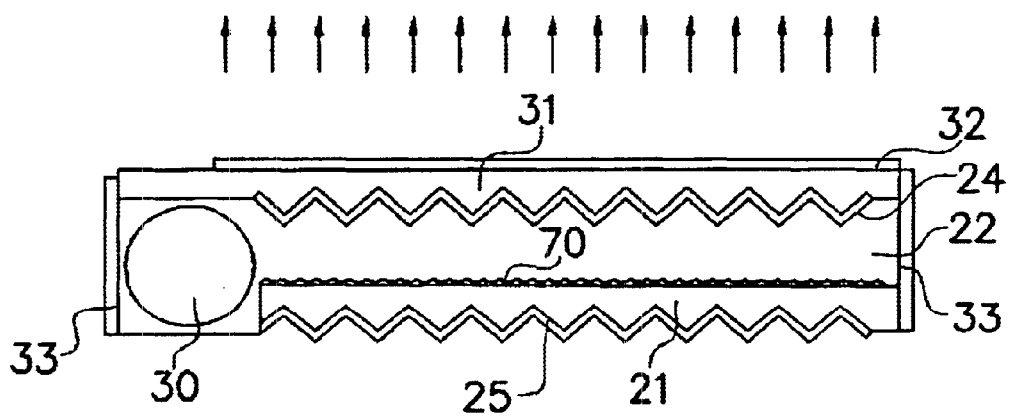
FIG. 2 is a schematic drawing showing a polarization splitting backlight module according to one embodiment of the present invention.

FIG. 2 illustrates the preferred embodiment of the polarization splitting backlight module according to the present invention. The polarization splitting backlight module is a laminate construction comprising an under plate 21, a light source 30, a substrate 22 and an upper cover 31. A thin film 24 is disposed between the substrate 22 and the upper cover 31, and the index of refraction thereof is different from that of the substrate 22. A scattering structure 70 is disposed between the under plate 21 and the substrate 22. The under plate 21 has an upper surface of unspecific profile and a ridged lower surface, and a phase retardation film 25 is disposed on the ridged lower surface. The phase retardation film 25 may be a dry film formed by an optical-precision application process or be coated through evaporation onto the ridged lower surface of the under plate. The phase retardation film 25 effects the phase retardation of the light beams emitted from the light source incident thereto so as to convert the polarization states of the light beams and then reflect the converted light beams. The scattering structure 70 also provides the conversion of polarization states of the light beams by means of the scattering effect. Therefore, the efficiency of the light beams passing through the upper cover 31 can be increased. In this embodiment, the ridge angles between ridges on the lower surface of the under plate 21, on the upper surface of the substrate 22 and on the lower surface of the upper cover 31 are 90 degrees respectively. The upper surface of the upper cover 31 is substantially flat, and an anti-reflective film 32 may be optionally disposed thereon so as to increase the efficiency of light beams passing through the upper cover 31.

The lower surface of the upper cover 31 is substantially complementary to the upper surface of the substrate 22. In order to enhance the optical performance, the ridge pitch of each of the ridged surfaces may be either constant or not and the ridges thereof are preferably not parallel to each other thus allowing greater freedom of converter design. The thin film 24 between the upper cover 31 and the substrate 22 functions to allow light beams of specific polarization state to pass therethrough.

As a feasible process in producing the polarization splitting backlight module of the present invention, the upper cover 31 and the substrate 22 should be joined together. In particular, both sides of the thin film 24 should be formed of optically transparent material, such as polymethylmethacrylate (PMMA), polycarbonate (PC) or ARTON™. Several conventional processes, such as spraying pouring or injection molding, may be utilized to produce the upper cover 31.

Figure 3:
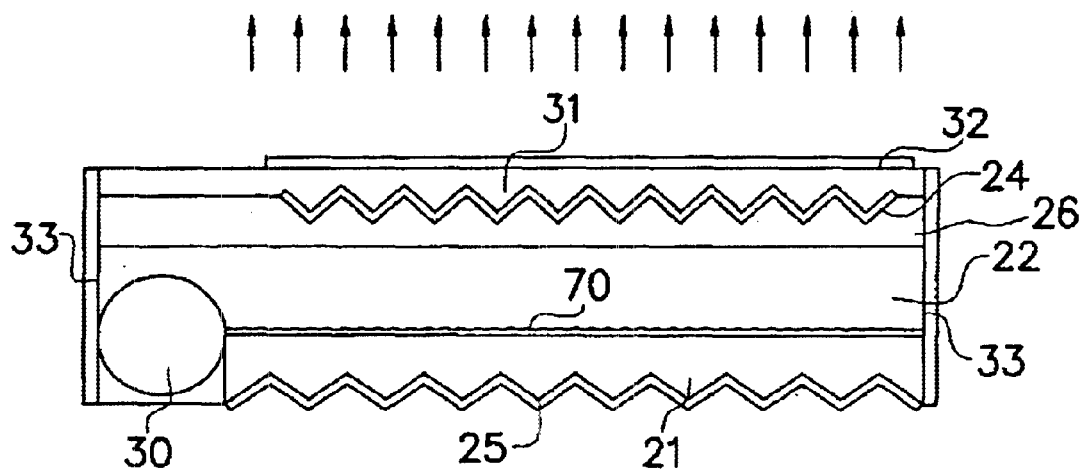
FIG. 3 is a schematic drawing showing a polarization splitting backlight module according to another embodiment of the present invention, integrated with a conventional backlight module.

With reference to FIG. 3, a polarization splitting backlight module according to another embodiment of the present invention is shown, the polarization splitting backlight module is also a laminate construction, comprising an under plate 21, a scattering structure 70, a substrate 22, an upper cover film 26 and an upper cover 31.

A thin film 24 is disposed between the upper cover film 26 and the upper cover 31. The scattering structure 70 is disposed between the under plate 21 and the substrate 22. The under plate 21 has an upper surface of unspecific profile and a ridged lower surface, and a phase retardation film 25 is disposed on the ridge lower surface of the under plate 21. The phase retardation film 25 effects the phase retardation of the light beams emitted from the light source incident thereto so as to convert the polarization states of the light beams and then reflect the converted light beams to the upper cover 31. The scattering structure 70 also provides the conversion of polarization states of the light beams by means of the scattering effect. Therefore, the efficiency of the light beams passing through the thin film 24 and the upper cover 31 can be increased. In this embodiment, the ridge angles between ridges on the lower surface of the under plate 21, on the upper surface of the upper cover film 26 and on the lower surface of the upper cover 31 are 90 degrees respectively. The upper surface of the upper cover 31 is substantially flat, and an anti-reflective film 32 may be optionally disposed thereon so as to enhance the efficiency of light beams passing therethrough.

Based on the above design, the upper cover 31, the upper cover film 26 and the thin film 24 may be combined and joined into a flexible and soft configuration such that, upon operation, it may be attached or through any other suitable process applied to join directly with the diffuser, which replaces the substrate 22 of the present invention. With this, light beams of a desirable polarization state from the backlight module of the present invention may be achieved.

The lower surface of the under plate 31 and the upper surface of the upper cover film 26 are ridged surface. In order to enhance the optical performance, the ridge pitch of each of the ridged surfaces may be constant or not, and the ridges thereof are preferably not parallel to each other thus allowing greater freedom of converter design. The thin film 24 disposed between the upper cover 31 and the upper cover film 26 functions to allow light beams of the specific polarization state to pass through. In addition, reflective films 33 may be optionally disposed on the lateral side-surfaces of the polarization splitting backlight module of the present invention so as to enhance the efficiency of light beams passing through the upper cover 31.

In this embodiment, ridge angles between ridges on each of the ridged surfaces are 90 degrees respectively, such that the light beams incident to the upper surface of the under plate proceed continuous reflection or total-reflection. Moreover, with different output characteristics of the polarization splitting backlight module, the composition of the thin film 24 between the upper cover 31 and the upper cover film 26 may be altered, and thereby linear or other specific light beam output can be provided.

Figure 4:
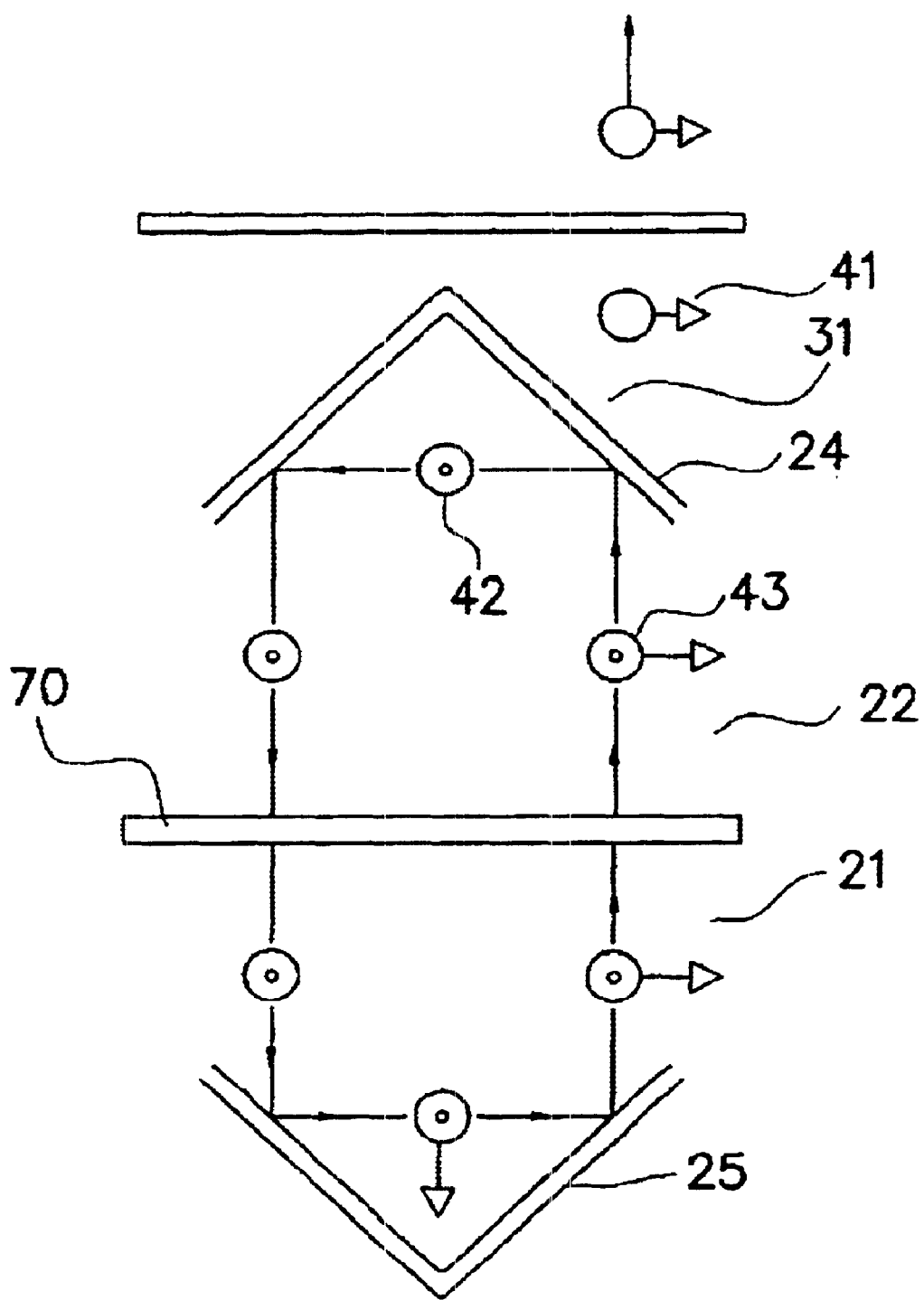
FIG. 4 is a schematic drawing showing the optical path in the polarization splitting backlight module according to the present invention.

With reference to FIG. 4, an optical path, regarding the light beams distributed uniformly in the polarization splitting backlight module, between the ridged lower surface of the under plate 21 and the ridged lower surface of the upper cover 31 is shown. In FIG. 4, a solid arrow designates the direction which the light beams propagate, a hollow arrow designates a P-polarized component 41, and a circle with a black dot therein designates a S-polarized component 42. It should be noted that the P-polarized component 41 means the component which may pass through the thin film 24 disposed between the substrate 22 and the upper cover 31, whereas the S-polarized component 42 is perpendicular to the P-polarized component 41 and will be reflected back by the thin film 24. In this case, while a non-polarized light beam 43 travels upward to the ridged lower surface of the upper cover 31, the P-polarized component 41 of the light beam will pass through the thin film 24 and enter the upper cover 31, whereas the S-polarized component 42 will be reflected. After the S-polarized component 42 is continuously reflected at the ridged lower surface of the upper cover 31 and lower surfaces of the under plate 21, it will be converted by the phase retardation film 25 disposed on the ridged lower surface of the under plate 21 to possess P- and S-polarized components partially. Similarly, the P-polarized component 41 will pass through the thin film 24 and the upper cover 31, whereas the S-component 42 will be reflected and converted again. Through a series of the above-mentioned procedures, the non-polarized light beam 43 is output as a single P-polarized light beam. It is noted that in FIG. 4, the ridge pitch of the ridged surfaces of the substrate 22 is constant.

Figure 5:
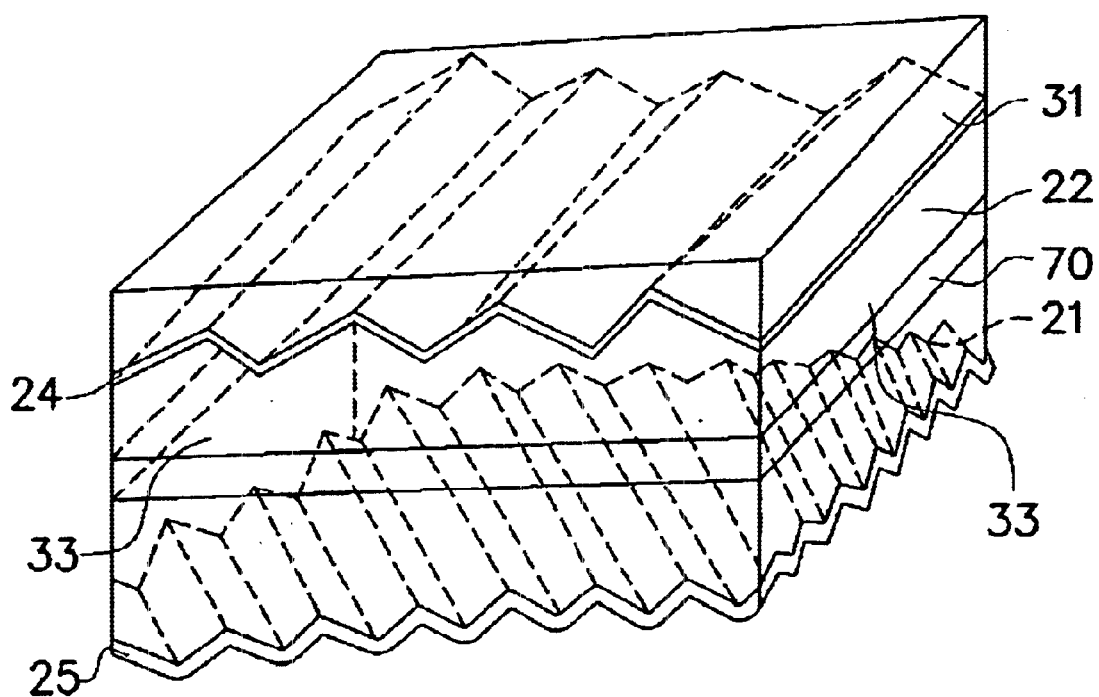
FIG. 5 is a perspective view of the polarization splitting backlight module according to the present invention.

FIG. 5 is a perspective view of a polarization splitting backlight module according to the present invention. It is shown that the ridge pitch of the ridged lower surface of the under plate 21 is not identical to that of the ridged lower surface of the upper cover 31, and the directions of the ridges on the ridged surfaces of the under plate 21 and of the upper cover 31 are not parallel to each other, thereby increasing the freedom of the designing the thin film 24. However, the relative surfaces of the two neighboring components, such as the substrate 22 and the upper cover 31, should be substantially complementary to each other, so that any additional film can be attached therebetween and especially avoid the occurrence of the morie effect.

Figure 6:
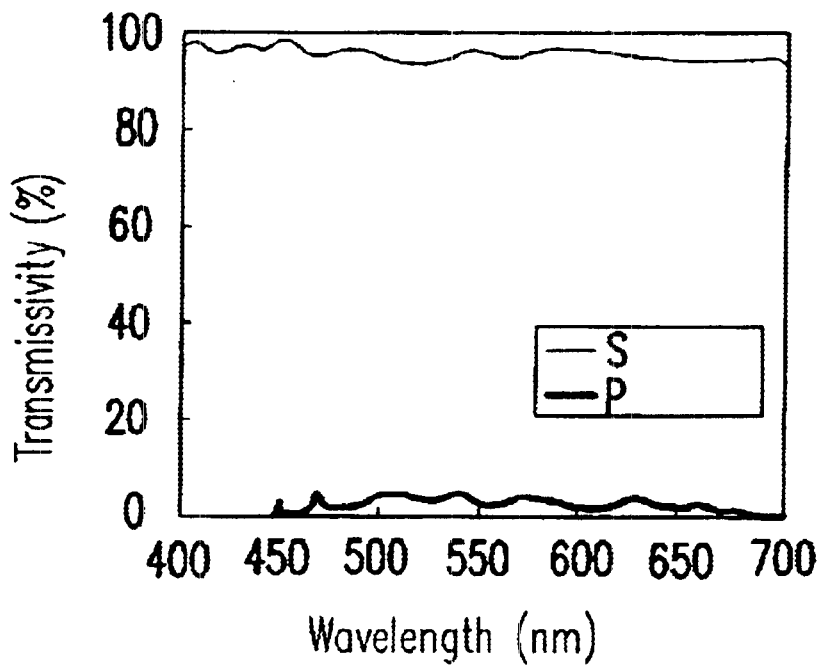
FIG. 6 shows the relationship between the transmissivity of P-S polarized components over different wavelengths of light beams incident to a typical thin film.
Figure 7:
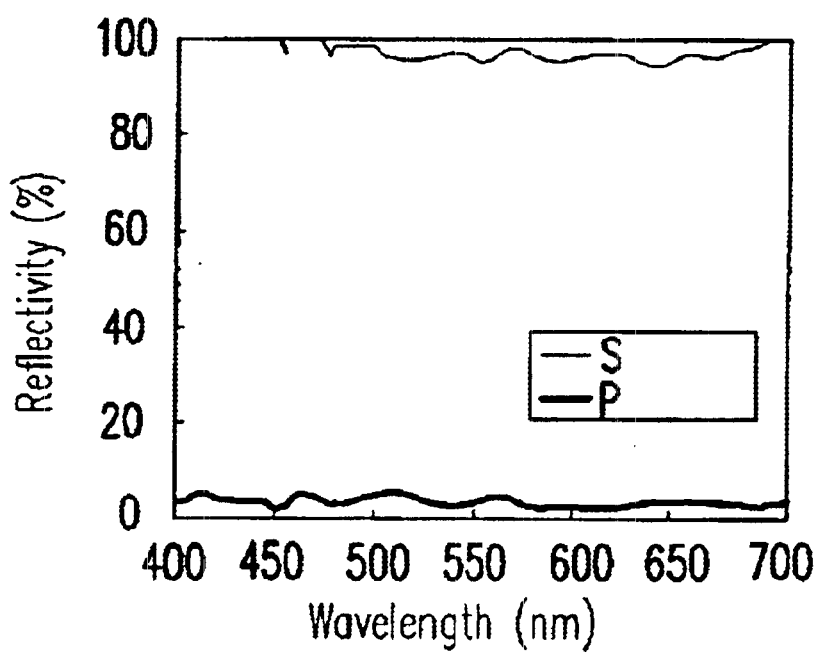
FIG. 7 shows the relationship between the reflectivity of P-S polarized components over different wavelengths of light beams incident to a typical thin film.
Figure 8:
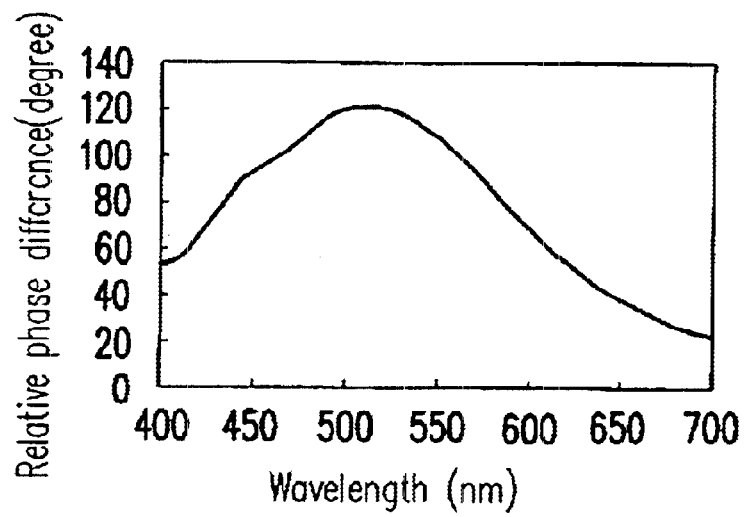
FIG. 8 shows the relationship between the relative phase difference of P-S polarized components over different wavelengths of light beams reflected by a typical phase retardation film of high reflectivity.
Figure 9:
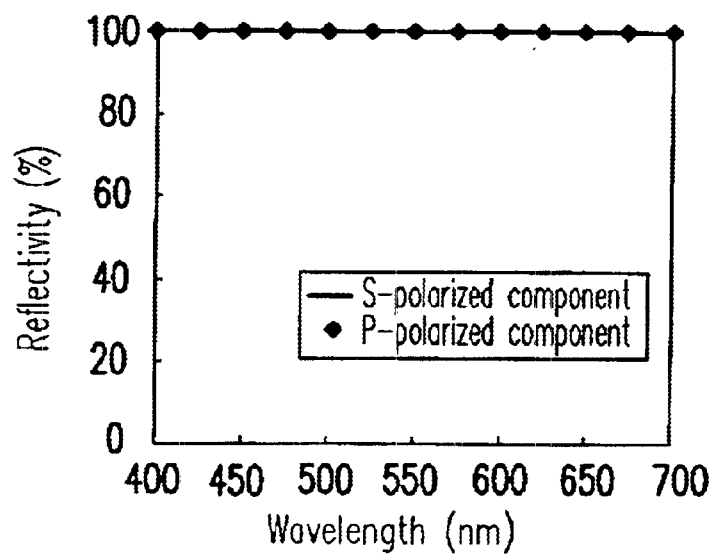
FIG. 9 shows the relationship between the reflectivity of P-S polarized components over different wavelengths of light beams reflected by a typical phase retardation film of high reflectivity.

The substrate 22 may be made of any suitable optical material, for example, plastic material such as PMMA, PC or ARTOM™ or any other glass material, depending on the specific process therefor. In designing a suitable optical coating thereof, it is fundamental to determine the refractivity of the substrate 22 in advance. Table 1 shows the refractivity over different wavelengths for ARTOM™ at different absorption rate and temperature. With reference to FIGS. 6 and 7, transmissivity and reflectivity of P-S polarized components over different wavelengths of light beams incident to a typical thin film are shown respectively. With referenced to FIGS. 8 and 9, the relative phase difference and reflectivity of P-S polarized components over different wavelengths of light beams reflected by a typical phase retardation film 25 of high reflectivity are shown respectively.

A phase retardation film 25 of high reflectivity disposed on the ridged lower surface of the under plate 21 may convert the light beam incident thereto in terms of polarization and reflect it back to interior of the substrate 22. For example, if the wavelength of the incident light beam is 400 to 700 mm, the ridge angel of the ridged lower surface of the under plate 21 is 90 degree, and the refractivity of the substrate 22 made of PMMA is 1.532, this coated film may be composed of MgF2, ZnS, CeF3, MgF2, ZnS, CeF3 and MgF2, and the thickness thereof may be respectively 110.82, 20.13, 84.88, 141.93, 111.47, 84.88 and 25.38 nm. If the above conditions remain the same except for a substrate 22 made of Norbornene (ARTOM™), the coated film may be composed of MgF2, ZnS, CeF3, MgF2, ZnS, CeF3 and MgF2, and the thickness thereof maybe 110.14, 26.54, 84.88, 139.92, 117.22, 84.88 and 117.71 nm respectively.

The thin film 24 disposed between the substrate 22 and the upper cover 31 allow the light beams of specific polarization state incident thereto to pass through and others to be reflected once the upper cover 31 and the substrate 22 are attached together. For example, if the wave length of the incident light beam is 400 to 700 nm, the ridge angle of the ridged upper surface of the substrate 22 is 90 degree, and the refractivity of the substrate 22 made of PMMA is 1.532, the specific composition and its thickness may be determined from Table 2. Alternatively, if the above conditions remain the same except for a substrate 22 made of Norbornene (ARTOM™), the composition and its thickness may be determined from Table 3.

Figure 10:
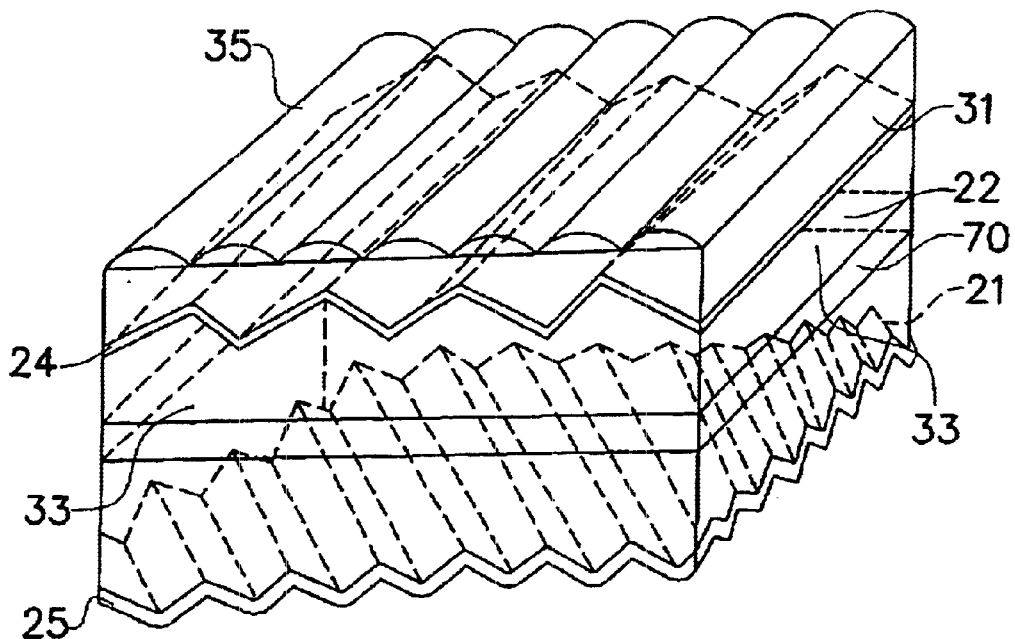
FIG. 10 is a perspective view of a polarization splitting backlight module in accordance with the present invention, in which a film having cylindrical undulations thereon is disposed on the upper surface of the upper cover.
Figure 11:
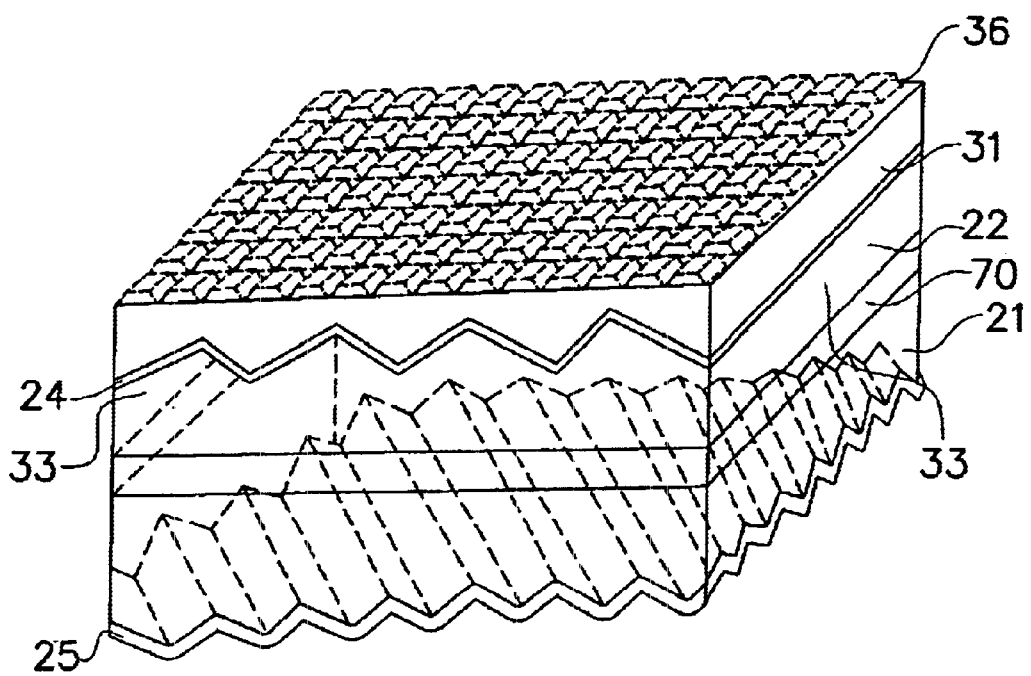
FIG. 11 is a perspective view of a polarization splitting backlight module in accordance with the present invention, in which a film having square protuberances thereon is disposed on the upper surface of the upper cover.

In order to enhance the efficiency of the light beams passing through the polarization splitting backlight module, an anti-reflective film 32 may be disposed on the upper surface of the upper cover 31. In addition, the upper surface may be sufficiently flat or of any suitable profile such that the light beam can be outputted in parallel or at any other suitable angle. FIG. 10 shows that a film 35 having cylindrical undulations thereon is disposed on the upper surface of the upper cover 31. FIG. 11 shows that a film 36 having square protuberances thereon is disposed on the upper surface of the upper cover 31. In this way, the output angle as well as the diffusion angle of the polarized light beams may be controlled and determined, and thus the output illuminance over different angles of view may be predetermined.

Four lateral side-surfaces of the substrate 22 may be provided with reflective film 33 to confine the light beams inside the substrate 22, so as to reduce the optical energy loss and further increase the optical performance of such a system. Table 4 shows several typical composition and thickness of the reflective films 33 coated through evaporation.

Figure 12:
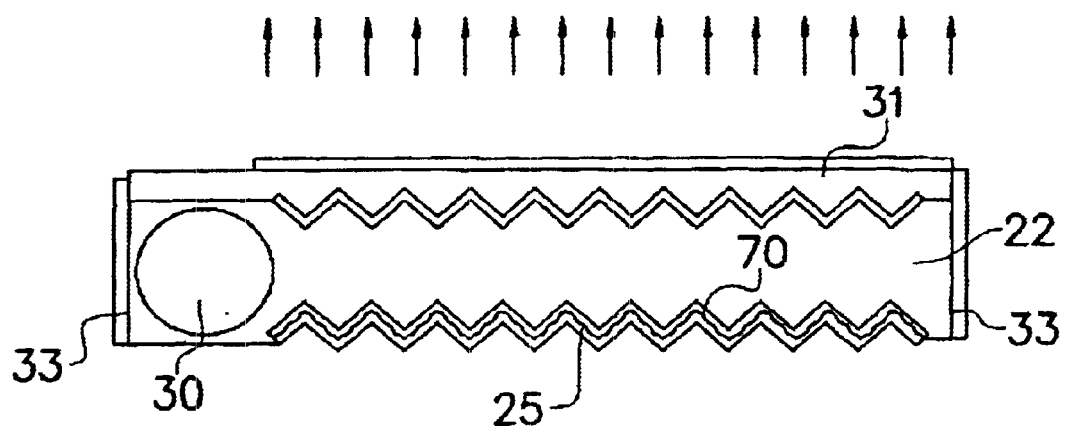
FIG. 12 is a sectional view of the polarization splitting backlight module in accordance with another embodiment of the present invention.

With reference to FIG. 12, another embodiment of the present invention is show. In this embodiment, the polarization splitting backlight module comprises a substrate 22 having a ridged upper surface and a ridged lower surface, a scattering structure 70 disposed on the ridged lower surface of the substrate 22, a phase retardation film 25 of high reflectivity disposed under the scattering structure 70, an upper cover 31 having a ridged lower surface and an upper surface, and a light source 30 located at the lateral side of the substrate 22. Similarly, reflective films 33 may be disposed on four lateral side-surfaces of the polarization splitting backlight module to confine the light beams emitted from the light source 30 within the interior of the substrate 22.

Figure 13:
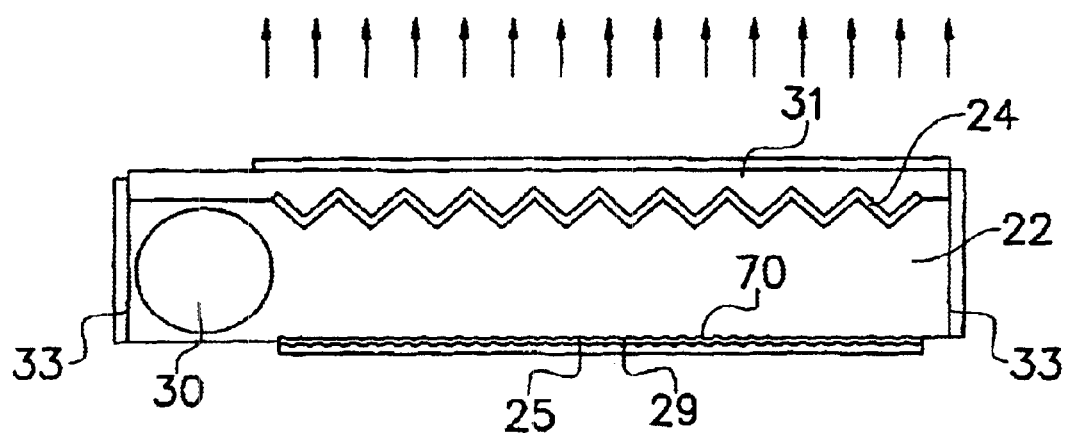
FIG. 13 is a sectional view of the polarization splitting backlight module in accordance with still another embodiment of the present invention.

Alternately, the light beams can be distributed uniformly inside the polarization splitting backlight module by means of scattering structure 70 only, rather than the ridged configuration. With reference to FIG. 13, the lower surface 29 of the substrate 22 of the polarization splitting backlight module is substantially flat, rather than a ridged configuration. In this embodiment, the polarization splitting backlight module comprises a substrate 22 having a ridged upper surface and a ridged lower surface, a scattering structure 70 disposed on the lower surface 29 of the substrate 22, a phase retardation film 25 of high reflectivity disposed under the scattering structure 70, an upper cover 31 having a ridged lower surface and an upper surface, and a light source 30 located at the lateral side of the substrate 22. Similarly, reflective films 33 may be disposed on four lateral side-surfaces of the polarization splitting backlight module to confine the light beams emitted from the light source 30 within the interior of the substrate 22.

Although the preferred embodiment of the present invention have been disclosed for illustrative purposes, those skilled in the art will appreciate that various modification, additions and substitutions are possible, without departing from the scope and spirit of the present invention as recited in the accompanying claims.

TABLE 1

ARTON FX26
Main Chain: NORBORNENE
Branch Chain: polyester function group

| | Measured wavelength | | | | |
|---|---|---|---|---|---|
| | 794.76 nm | 656 nm | 588 nm | 486 nm | 436 nm |
| Absorption rate (%) | | | | | |
| 0.01 | 1.5161 | 1.5198 | 1.5227 | 1.5298 | 1.5354 |
| 0.25 | 1.5163 | 1.5200 | 1.5230 | 1.5300 | 1.5357 |
| temperature (° C.) | | | | | |
| 30 | 1.515 | 1.519 | 1.521 | 1.528 | 1.534 |
| 40 | 1.514 | 1.518 | 1.520 | 1.527 | 1.533 |

TABLE 2

Typical thin film as to composition and thickness
(unit: nm, substrate: PMMA)

ZnS 20.99 ' $Na_3AlF_6$ 98.19 ' ZnS 47.15 ' $Na_3AlF_6$ 99.16 '
ZnS 29.58 ' $Na_3AlF_6$ 141.21 ' ZnS 40.27 ' $Na_3AlF_6$ 94.87 '
ZnS 44.40 ' $Na_3AlF_6$ 119.53 ' ZnS 45.04 ' $Na_3AlF_6$ 92.66 '
ZnS 154.73 ' $Na_3AlF_6$ 169.16 ' ZnS 15.99 ' $Na_3AlF_6$ 75.86 '
ZnS 87.82 ' $Na_3AlF_6$ 283.13 ' ZnS 65.74 ' $Na_3AlF_6$ 96.03 '
ZnS 33.77 ' $Na_3AlF_6$ 110.39 ' ZnS 70.09 ' $Na_3AlF_6$ 283.27 '
ZnS 73.35 ' $Na_3AlF_6$ 100.38 ' ZnS 36.82 ' $Na_3AlF_6$ 99.62 '
ZnS 46.08 ' $Na_3AlF_6$ 316.85 ' ZnS 97.96 ' $Na_3AlF_6$ 239.98 '
ZnS 80.59 ' $Na_3AlF_6$ 234.61 ' ZnS 93.97 ' $Na_3AlF_6$ 249.77 '
ZnS 108.62 ' $Na_3AlF_6$ 120.21

TABLE 3

Typical thin film as to composition and thickness
(Unit: nm, substrate: ARTON ™)

ZnS 10.57 ' $Na_3AlF_6$ 125.72 ' ZnS 51.25 ' $Na_3AlF_6$ 55.35 '
ZnS 48.71 ' $Na_3AlF_6$ 147.30 ' ZnS 28.53 ' $Na_3AlF_6$ 110.45 '
ZnS 49.03 ' $Na_3AlF_6$ 119.80 ' ZnS 40.04 ' $Na_3AlF_6$ 100.49 '
ZnS 153.25 ' $Na_3AlF_6$ 326.16 ' ZnS 97.71 ' $Na_3AlF_6$ 276.36 '
ZnS 56.00 ' $Na_3AlF_6$ 93.48 ' ZnS 35.15 ' $Na_3AlF_6$ 113.18 '
ZnS 78.81 ' $Na_3AlF_6$ 287.44 ' ZnS 62.71 ' $Na_3AlF_6$ 104.21 '
ZnS 37.74 ' $Na_3AlF_6$ 106.49 ' ZnS 51.39 ' $Na_3AlF_6$ 307.32 '
ZnS 91.51 ' $Na_3AlF_6$ 254.75 ' ZnS 80.68 ' $Na_3AlF_6$ 236.81 '
ZnS 93.10 ' $Na_3AlF_6$ 260.58 ' ZnS 104.44 ' $Na_3AlF_6$ 134.42 '

TABLE 4

Typical reflective film as to composition and thickness
(unit: nm)

ZnS 38.59 ' $MgF_2$ 66.30 ' ZnS 41.01 ' $MgF_2$ 70.47 ' ZnS 43.59 '
$MgF_2$ 74.89 ' ZnS 46.33 ' $MgF_2$ 79.60 ' ZnS 49.24 ' $MgF_2$ 84.60 '
ZnS 52.33 ' $MgF_2$ 89.91 ' ZnS 55.62 ' $MgF_2$ 95.56 ' ZnS 59.11 '
$MgF_2$ 101.56 ' ZnS 62.83 ' $MgF_2$ 107.93 ' ZnS 66.77 ' $MgF_2$ 114.73 '
ZnS 70.96 ' $MgF_2$ 121.92 ' ZnS 75.41 ' $MgF_2$ 129.58 ' ZnS 80.15 '
$MgF_2$ 137.72 ' ZnS 85.18 ' $MgF_2$ 146.38 ' ZnS 90.54 ' $MgF_2$ 155.56 '
ZnS 96.23 ' $MgF_2$ 165.34 ' ZnS 102.27 ' $MgF_2$ 175.72 ' ZnS 108.70

What is claimed is:

1. A polarization splitting backlight module, comprising:

a substrate having a ridged upper surface and a lower surface;

a scattering structure disposed on the lower surface of the substrate;

a phase retardation film of high reflectivity, disposed under the scattering structure;

an upper cover having a ridged lower surface, substantially complementary to the upper surface of the substrate and facing therewith, and an upper surface; and a light source located at the lateral side of the substrate.

2. The polarization splitting backlight module of claim 1, further comprising an anti-reflective film disposed on the upper surface of the upper cover.

3. The polarization splitting backlight module of claim 1, further comprising reflective films disposed on the lateral side-surface of the substrate.

4. The polarization splitting backlight module of claim 1, wherein the ridge angle between two neighboring ridges on the ridged lower surface of the upper cover is in a range from 45 degrees to 135 degrees.

5. The polarization splitting backlight module of claim 1, wherein the upper surface of the upper cover is substantially flat.

6. The polarization splitting backlight module of claim 1, wherein the phase retardation reflective film is a dry film formed by an optical-precision application process.

7. The polarization splitting backlight module of claim 1, wherein the lower surface of the substrate is substantially flat.

* * * * *